(12) United States Patent
Kawada et al.

(10) Patent No.: US 6,804,710 B1
(45) Date of Patent: Oct. 12, 2004

(54) CONFIGURATION INFORMATION MANAGEMENT SYSTEM, METHOD, PROGRAM, AND PROGRAM STORAGE DEVICE

(75) Inventors: Shinichi Kawada, Yokohama (JP); Motoaki Hirabayashi, Yokohama (JP); Mitsugu Yamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 760 days.

(21) Appl. No.: 09/696,129

(22) Filed: Oct. 24, 2000

(30) Foreign Application Priority Data

Mar. 10, 2000 (JP) ...................................... 2000-066548

(51) Int. Cl.[7] .......................................... G06F 15/177
(52) U.S. Cl. ...................... 709/221; 709/201; 709/203; 709/220; 709/223; 709/224; 717/176; 717/177; 717/178
(58) Field of Search ................................ 709/201–203, 709/220–224; 717/176–178

(56) References Cited

FOREIGN PATENT DOCUMENTS

JP     06332779     12/1994

*Primary Examiner*—Jack B. Harvey
*Assistant Examiner*—Hien Le
(74) *Attorney, Agent, or Firm*—Townsend and Townsend and Crew LLP

(57) ABSTRACT

A method for enabling logical configuration information to be divided into those in specific ranges, thereby making it easier to manage logical configuration information of each of distributed computers. The above method, which manages configuration information of each of distributed computers, comprises a step of setting up configuration information in a specific range in a computer in the specific range; a step of requesting acquisition of configuration information set up in another computer; a step of sending configuration information set up in a subject computer to above-described another computer; and a step of updating configuration information of the subject computer with configuration information received from above-described another computer.

7 Claims, 11 Drawing Sheets

FIG.4

1. COMMUNICATION DATA (1)

| COMMUNICATION DATA ID PART | DATA PART |
|---|---|
| HIERARCHICAL INFORMATION DISTRIBUTION | COMPUTERS HIERARCHICAL INFORMATION |

401 — COMMUNICATION DATA ID PART; 402 — DATA PART; 411 — HIERARCHICAL INFORMATION DISTRIBUTION; 412 — COMPUTERS HIERARCHICAL INFORMATION

2. COMMUNICATION DATA (2)

| COMMUNICATION DATA ID PART | DATA PART |
|---|---|
| HIERARCHICAL INFORMATION SETUP | COMPUTERS HIERARCHICAL INFORMATION |

421 — HIERARCHICAL INFORMATION SETUP; 422 — COMPUTERS HIERARCHICAL INFORMATION

3. COMMUNICATION DATA (3)

| COMMUNICATION DATA ID PART |
|---|
| SYNCHRONIZATION REQUEST |

431 — SYNCHRONIZATION REQUEST

4. COMMUNICATION DATA (4)

| COMMUNICATION DATA ID PART |
|---|
| LOWER-ORDER HIERARCHICAL INFORMATION ACQUISITION REQUEST |

441 — LOWER-ORDER HIERARCHICAL INFORMATION ACQUISITION REQUEST

5. COMMUNICATION DATA (5)

| COMMUNICATION DATA ID PART | DATA PART |
|---|---|
| LOWER-ORDER HIERARCHICAL INFORMATION | LOWER-ORDER COMPUTERS HIERARCHICAL INFORMATION |

451 — LOWER-ORDER HIERARCHICAL INFORMATION; 452 — LOWER-ORDER COMPUTERS HIERARCHICAL INFORMATION

PHYSICAL CONFIGURATION

LOGICAL CONFIGURATION (DEFINED BY THE MANAGER ACCORDING TO THE USE PURPOSE)

CONFIGURATION INFORMATION MANAGEMENT SYSTEM, METHOD, PROGRAM, AND PROGRAM STORAGE DEVICE

CROSS-REFERENCES TO RELATED APPLICATIONS

This application claims priority from Japanese Patent Application Reference No. 2000-066548, filed Mar. 10, 2000.

BACKGROUND OF THE INVENTION

The present invention relates to a configuration information management system for managing configuration information of each of distributed computers, more particularly to an effective technique preferred for a configuration information management system for setting up the configuration information divided and defined in each computer as its route information.

There is a conventional method for managing configuration information of each of distributed computers collectively by setting up the whole configuration of those distributed computers in one computer referred to as a manager. In this case, the configuration information of each computer is entered to the manager manually or the manager attempts to communicate with each of those distributed computers so as to collect the configuration information of each lower-order computer in a network according to the returned IP address (hereinafter, the processing will be referred to as polling).

There is also another conventional method employed when a system configuration has a hierarchical structure consisting of branch offices, departments, etc. The manager has hierarchical layers in such a case. In this case, the manager of a lower-order hierarchical layer is referred to as a sub-manager. When managing such a lower-order hierarchical information, the configuration information of each computer under the sub-manager in a network is entered to the sub-manager manually or the sub-manager collects the configuration information through the above-described polling.

The system configuration information entered or collected as described above is displayed as a system configuration map and used by the manager to execute remote commands to specified distributed computers on the map. The system configuration information is also used by each of the distributed computers to send events to its higher-order computer.

The Japanese Patent Prepublication No.6-332779 discloses another method for managing the configuration information. According to the method, the whole configuration information is not set up in the manager. Each computer has only the configuration information of each of its lower-order computers.

SUMMARY OF THE INVENTION

Conventionally, to set up the whole configuration information of distributed computers, the configuration information is entered to the manager manually at a time. In this case, in case the configuration of a branch office, a department, or the like in the system is modified, the supervisor of the manager computer must modify the configuration, so that the configuration modification of the whole system is concentrated on the manager computer. The load of the supervisor in the modification of the configuration information of the manager will thus be increased excessively. This has been a problem of the conventional method.

In this case, the entire configuration information of the lower-order computers can be set up in each sub-manager. In a large department, however, one department supervisor often manages a plurality of sub-managers, so that the supervisor must set up the configuration information at each sub-manager computer. The supervisor's labor has thus become a problem. In this case, the supervisor can also modify the configuration information by remote operation. Still in this case, because the manager must set up the configuration information for each sub-manager, it has arisen another problem that the remote operation takes much time and labor from the supervisor of the manager computer.

The method for collecting information from lower-order computers in a network by polling can save the manual data input labor, but it can apply only to the collection of such physical network configuration information as the IP address and the MAC address set in each computer. In actual usage of the configuration information, the method is not suitable for setting up the configuration information of a system when logical configuration of the system must be managed for each use purpose of computers. This is because computers whose use purposes are different from each another, for example, distribution management computers, application execution computers, etc., are often installed together in a physical network. Generally, the logical configuration of a system is often formed over a plurality of networks, so the logical configuration information must be set up separately from the physical configuration information.

The physical configuration mentioned here means information denoting how computers are actually arranged in a network as shown in FIG. 11. Information of respective computers is, as described above, the IP address, the MAC address, etc. set up in each computer.

Unlike the physical configuration, the logical configuration is defined by a human being and it means information denoting the relationship among computers. For example, a supervisor defines a computer 1 shown in FIG. 11 as a "manager", a computer 2 shown in FIG. 11 as a "client 1", a computer 3 shown in FIG. 11 as a "sub-manager 1", a computer 4 shown in FIG. 11 as a "sub-manager 2", and a computer 5 shown in FIG. 11 as a "client 2" respectively. FIG. 12 (upper figure) shows an image of the assignment. A logical configuration (a hierarchical structure of computers) defines those computers by use purpose so as to represent those computers as a tree structure according to each use purpose of the computers separately from the actual physical arrangement of them. FIG. 12 (lower figure) shows this logical configuration. In the above case, "manager", "client", etc. are used to describe the definition of each use purpose of computers, but they may be replaced with other words, of course.

The Japanese Patent Prepublication No.6-332779 discloses a method for managing hierarchical information of computers. This publication does not describe any method for setting up the hierarchical information, however.

Under such circumstances, it is an object of the present invention to provide a technique that can solve the above conventional problems and divide logical configuration information of computers into configuration information in specific ranges, thereby making it easier to manage the logical configuration information of each of distributed computers.

In order to achieve the above object, the configuration information management system for managing configuration information of each of a plurality of distributed computers according to the present invention enables configuration information to be set up in a specific range, then the set-up configuration information is reflected throughout the entire configuration information of the system.

In the configuration information management system of the present invention, in case the system configuration information is modified due to addition of a computer, etc. the configuration information denoting the configuration in the specific range including the modified portion is entered into the system then the modified configuration information is sent to all the computers in the range denoted by the configuration information, thereby the configuration information is set up in each of the computers in the subject range.

The configuration information management system of the present invention also requests each of the distributed computers to send its configuration information set up in the computer after setting up the configuration information denoting the configuration in a specific range as described above. Receiving the request, each computer reads the configuration information set up in itself and sends it to other computers sequentially, then receives the configuration information of each of those other computers, thereby updating the configuration information in itself.

As described above, the present invention enables the configuration information in a specific range to be set up, then the configuration of each computer to be set up in other computers so that the configuration information set up in the specific range is reflected throughout the configuration information of the whole system. The supervisor who is not required to know the entire configuration of all the distributed computers when modifying the configuration of a computer, can modify the configuration information of the whole system by giving the configuration information divided into that in a specific range to all the distributed computers. One of the divided hierarchical information layers in specific ranges may include a plurality of department sub-managers.

Furthermore, according to the present invention, configuration information may be sent and set up with a command from a computer that is not included in the system configuration information and the supervisor can modify the configuration information from any place regardless of the place where the manager is installed.

In a specific embodiment, even a computer that is not included in the logical configuration of a system can send and set up its configuration information if it can access a manager computer.

As described above, according to the present invention, because hierarchical information is divided into specific ranges and given to other computers, the logical configuration information of a system over one or a plurality of sub-managers can be managed easily. Because the hierarchical information held in each of distributed computers is minimized, the storage capacity of a plurality of the information can be minimized. The number of computers whose configuration information must be updated due to partial modification of the system configuration information becomes less. This method is especially effective when a system is comprised of many distributed computers.

As described above, according to the configuration information management system of the present invention, configuration information, after it is set up in a specific range, is reflected throughout the configuration information of the whole system, so the logical configuration information of a system can be divided into specific ranges and given to other computers in each specific range, thereby making it easier to manage the logical configuration information of each of those distributed computers.

BRIEF DESCRIPTION OF THE DRAWINGS

Other objects and advantages of the invention will become apparent during the following discussion of the accompanying drawings, wherein:

FIG. 4 shows communication data types employed in the embodiment of the present invention;

DESCRIPTION OF THE SPECIFIC EMBODIMENTS

Hereunder, a description will be made for a configuration information management system for managing configuration information of each of distributed computers in an embodiment of the present invention.

Figure 1:
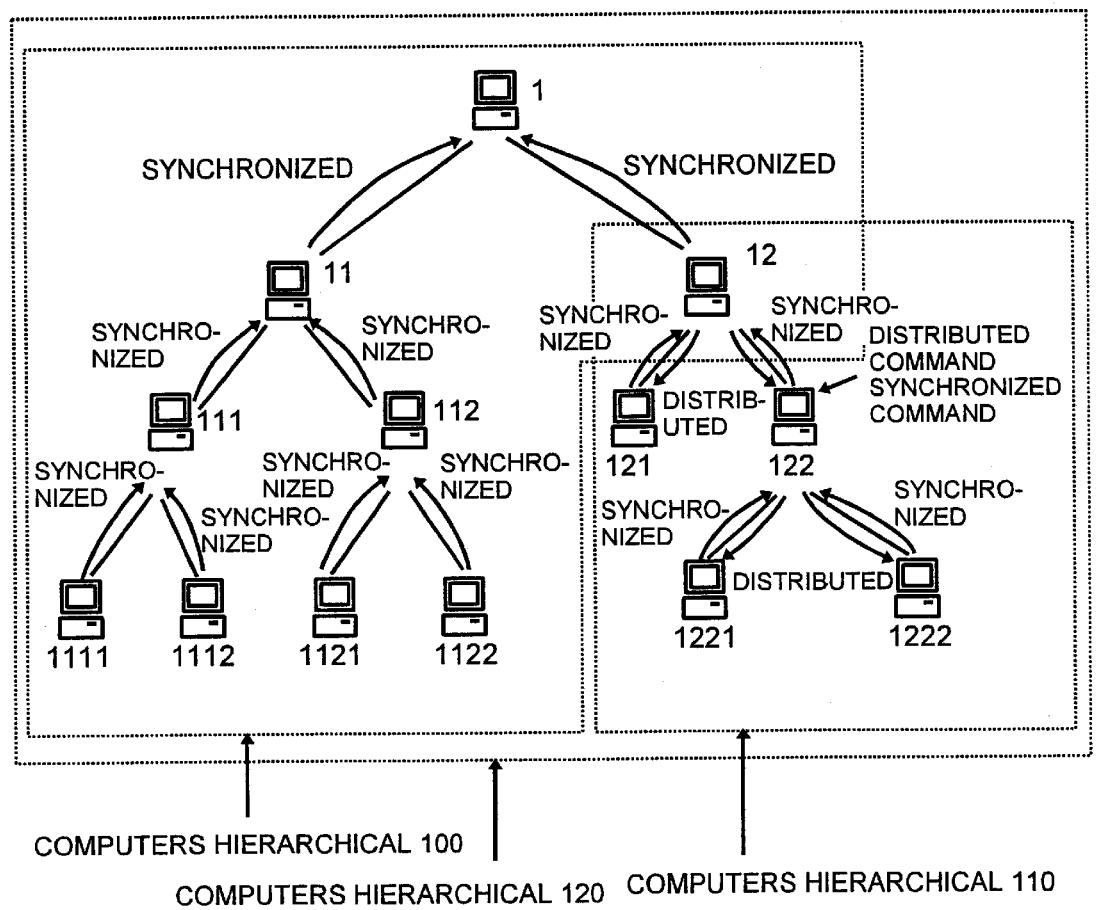
FIG. 1 is a block diagram of an entire configuration information management system in the embodiment of the present invention.

FIG. 1 is a block diagram of the whole configuration information management system in the embodiment of the present invention. In FIG. 1, the configuration (logical configuration) of the computers disposed in each department of a company is shown. A computer 1 is a management server disposed in the head office and computers 11 and 12 are management servers in branch offices. Computers 111 and 112, as well as 121 and 122 are management servers disposed in departments. Computers 1111 and 1112, 1121 and 1122, and 1221 and 1222 are terminals disposed in those departments.

Computers hierarchical information layer 120 denotes a hierarchical configuration of the entire system. Computer hierarchical information layers 100 and 110 are divided computer hierarchical information layers. In FIG. 1, the computer hierarchical information layer 110 of a branch office is added to the computer hierarchical information layer 100 of the head office.

As shown in FIG. 1, in case the configuration is modified in such a specific range of a branch office or the like denoted by the computer hierarchical information 110, the supervisor enters the computer hierarchical information layer 110 denoting the configuration in the range newly so as to execute a distribution command, thereby directing the distribution of the hierarchical information. Receiving the distribution command for the hierarchical information, the new hierarchical information is set up in the computers in the range, beginning at the highest-order computer 12. The new hierarchical information is thus set up in all the computers in the range.

As described above, after the configuration information denoting such a specific range as a branch office having distributed computers is set up in the computers in the range, the supervisor executes a synchronized command so as to direct a synchronization process for reflecting the hierarchical information set in each computer throughout the entire system. Receiving the command for synchronizing the hierarchical information, the hierarchical information is sent to the lower-order computers in ascending order, beginning at the lowest-order computers 1111 and 1112, 1121 and 1122, as well as 1221 and 1222 under the control of the highest-order computer 1. The hierarchical information divided into the computer hierarchical information layers 100 and 110 are thus integrated into the computer hierarchical information layer 120.

Concretely, the computers 1111 and 1112 send their hierarchical information to the computer 111, which is their upper-order computer. In the same way, the computers 1121 and 1122, as well as the computers 1221 and 1222 send their hierarchical information to their upper-order computers respectively.

The computer 111 integrates information received from the computers 1111 and 1112 so as to create a lower-order computers hierarchical information layer, thereby updating the lower-order computer's hierarchical information held in itself. The computer 111 then sends the created lower-order computers hierarchical information to its upper-order computer 11.

The computer 11 then sends the hierarchical information of its lower-order computers to its upper-order computer 1. The hierarchical information of the lower-order computers is created by integrating the hierarchical information received from the computer 111 and the hierarchical information received from the computer 112. Finally, the computer 1 (the highest-order computer of the hierarchical structure of the above computers) integrates the hierarchical information of the lower-order computers of the computer 11 received from the computer 11 and the hierarchical information of the lower-order computers of the computer 12 received from the computer 12 so as to form the hierarchical information 120 of all the computers in the system.

Hierarchical information is thus sent from lower-order computers to upper-order computers sequentially in response to each of a plurality of executed synchronized commands (synchronization processings) as described above, thereby the hierarchical information held in each of those computers is updated. Therefore, the supervisor is not always required to know the hierarchical structure of the respective computers in the system.

Figure 2:
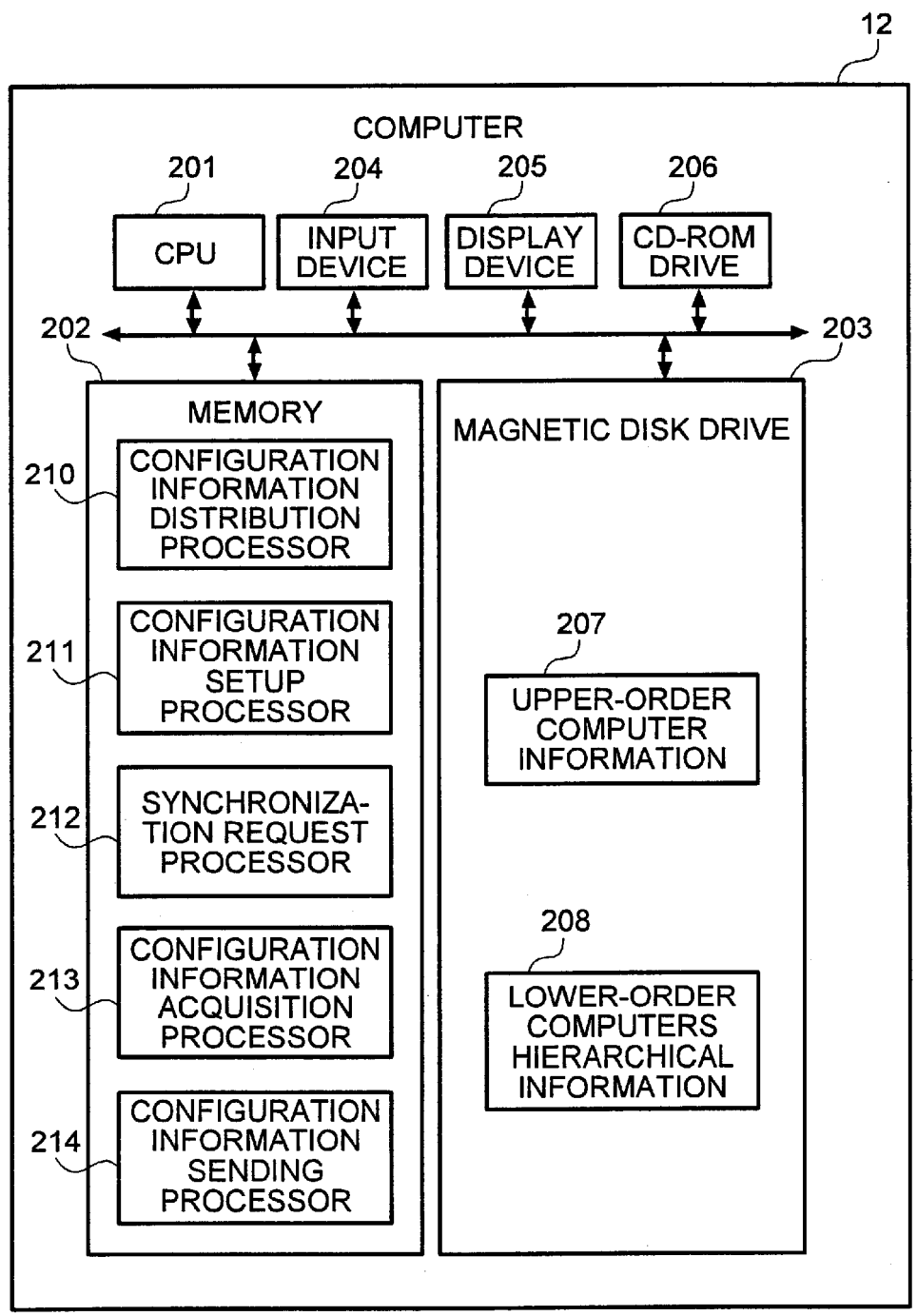
FIG. 2 is a schematic block diagram of a computer 12 in the embodiment of the present invention.

FIG. 2 shows a schematic block diagram of a computer 12 in this embodiment. As shown in FIG. 2, the computer 12 in this embodiment includes a CPU 201; a memory 202; a magnetic disk drive 203; an input device 204; a display device 205; a CD-ROM drive 206, upper-order computer information 207; and hierarchical information of lower-order computers 208.

The CPU 201 controls the operation of the whole computer 12. The memory 202 loads various processing programs used to manage the configuration information of each of distributed computers. The magnetic disk drive 203 is a memory device used to store the above-described programs, as well as such data as the upper-order computer information 207 and the hierarchical information of the lower-order computers 208, etc.

The input device 204 is used to receive operation commands issued to the computer 12. The display device 205 displays an operation state of the computer 12. The CD-ROM device 206 reads the above-described programs from a CD-ROM set therein.

The upper-order computer information 207 includes such information as the IP address, the host name, etc. of the upper-order computer connected to the computer 12. The hierarchical information 208 of each of the lower-order computers includes such information as the IP address, the host name, etc. denoting the hierarchical structure of the lower-order computers connected to the computer 12.

The computer 12 comprises a configuration information distribution processor 210; a configuration information set-up processor 211; a synchronization request processor 212; a configuration information acquisition processor 213; and a configuration information sending processor 214.

The configuration information distribution processor 210 is a processor for distributing the configuration information of each computer in a specific range to the highest-order computer in the range. The configuration information set-up processor 211 is a processor for setting up the configuration information denoting the configuration in a specific range in each computer in the range.

The synchronization request processor 212 is a processor for requesting the highest-order computer to execute a synchronization process so as to reflect the configuration information set up in each computer throughout the whole system. The configuration information acquisition processor 213 is a processor for updating the configuration information set up in a subject computer with the configuration information acquired from other computers. The configuration information sending processor 214 is a processor for sending the set-up configuration information of the subject computer to other computers.

The programs used to enable the computer 12 to function as each of the configuration information distribution processor 210; the configuration information set-up processor 211; the synchronization request processor 212; the configuration information acquisition processor 213; and the configuration information sending processor 214 are written on a CD-ROM, etc., then stored on a magnetic disk or the like. Those programs are loaded in the memory when they are executed respectively. The recording medium in which those programs are to be written may be a recording medium other than the CD-ROM.

Figure 12:
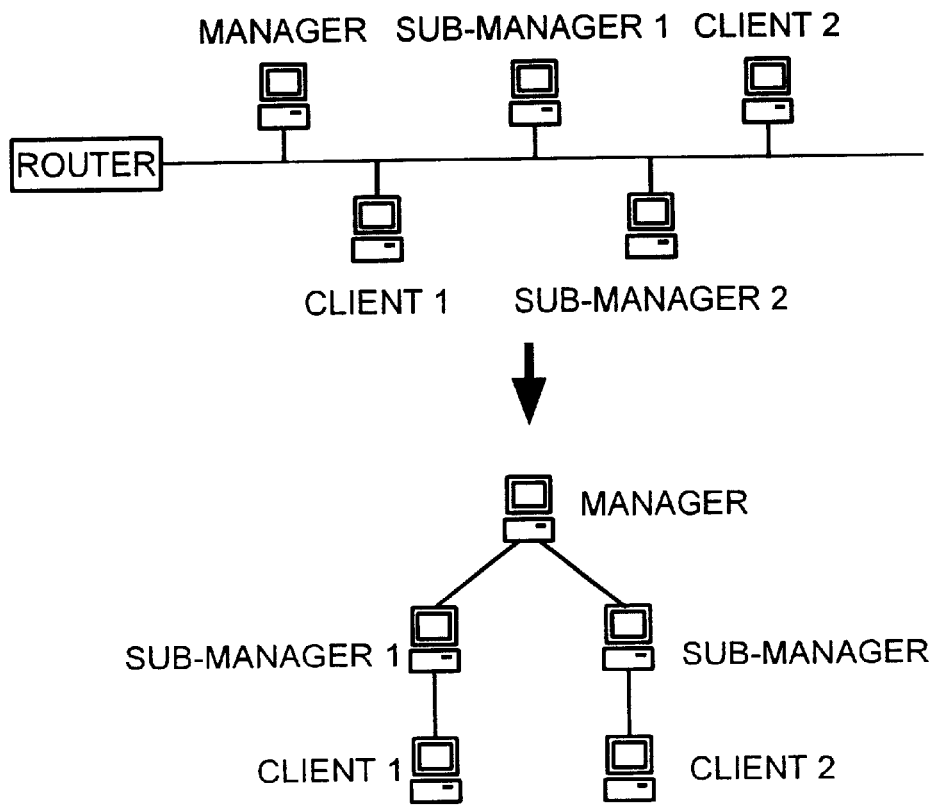
FIG. 12 shows an example of a logical configuration of the configuration information management system.

The configuration of each of other computers described above is assumed to be the same as that of the computer 12 shown in FIG. 12.

Figure 3:
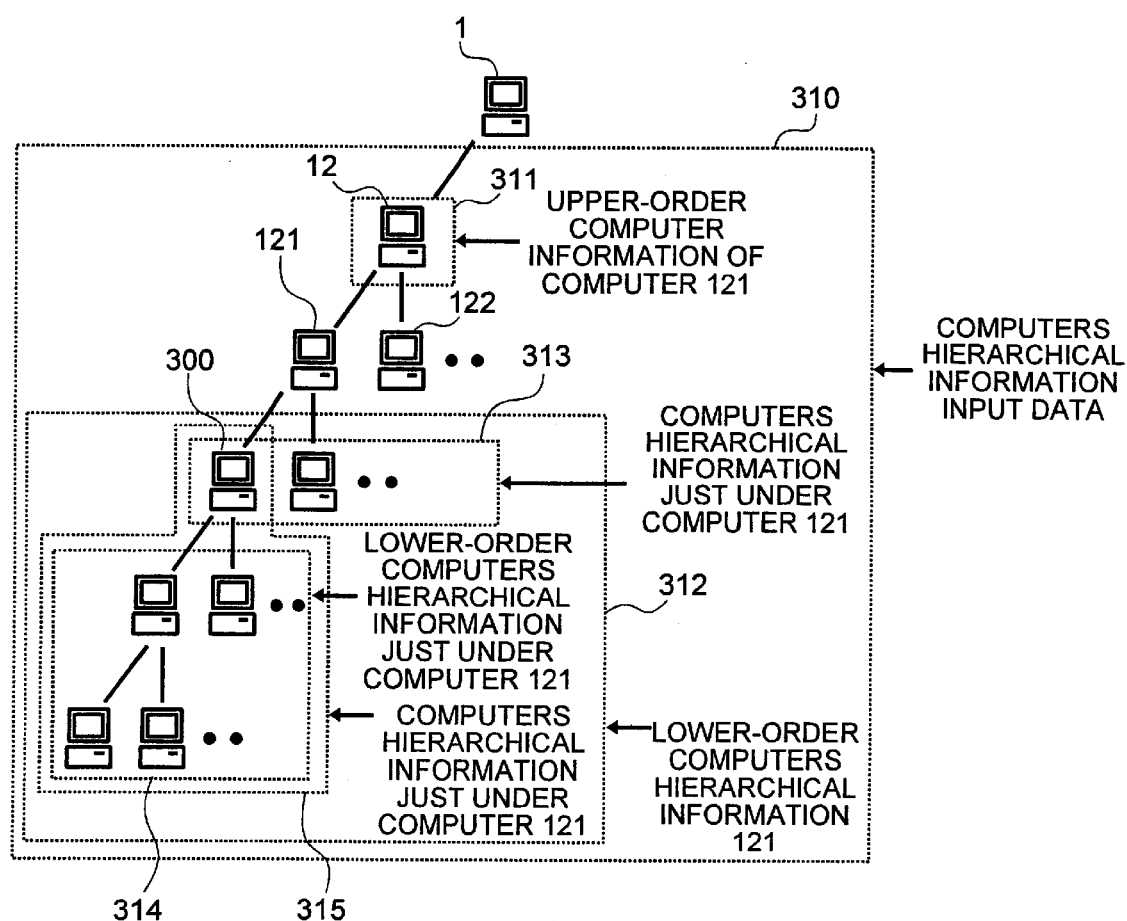
FIG. 3 is an example of hierarchical information of computers in the embodiment of the present invention.

The upper-order computer information 207 stored in the computer 12 shown in FIG. 2 denotes the upper-order computer of the computer 12. The upper-order computer of the computer 121 shown in FIG. 3 is the computer 12. The computer 121 has such information as the IP address, etc. of the computer 12.

The hierarchical information of the lower-order computers stored in the computer 12 shown in FIG. 2 denotes the hierarchical information of the lower-order computers of the computer 12 (shown in FIG. 3 as a tree-structure image).

As described above, each computer in the above system has both of the upper-order computer information 207 and the hierarchical information 208 of its lower-order computers. Only the highest-order computer (the computer 1 in FIG. 3) in the hierarchical structure of computers stores the hierarchical information of the computers in the system.

FIG. 3 shows an example of the hierarchical information of computers in this embodiment. In FIG. 3, an explanatory view of the computers hierarchical information input data 310 is shown. The input data 310 is entered when lower-order computers 300, etc. are defined under the computer 121 shown in FIG. 1. Information such as the IP address, host name, etc. of each computer is connected as a tree structure.

In this embodiment, the upper-order computer information 311 to the hierarchical information 315 of computers denote information seen from a specific computer defined in the hierarchical information of computers. The upper-order computer information 311 shown in FIG. 3 denotes the upper-order computer information seen from the computer 121. The hierarchical information 312 of lower-order computers denotes the hierarchical information of the lower-order computers seen from the computer 121. The computer information 313 denotes information of computers including the computer 300, etc. positioned just under the computer 121. The lower-order computers hierarchical information 314 denotes the hierarchical information of the lower-order computers seen from the computer 300 positioned just under the computer 121. The computers hierarchical information 315 denotes the hierarchical information of the lower-order computers of the computer 300 positioned just under the computer 121 or under.

FIG. 4 shows types of communication data employed in this embodiment. As shown in FIG. 4, the communication data in this embodiment has a communication data ID part 401 denoting a type of communication data and a data part 402 denoting the communication data body.

The communication data (1) has a communication data format used for transferring computers hierarchical information 412 sent by a distribution command. The communication data (2) has a communication data format used to transfer the computers hierarchical information 422, which is set in the upper-order computer information 207 and the lower-order computers hierarchical information 208 respectively.

The communication data (3) has a communication data format used to send computers hierarchical information layers 100 and 110 to each computer in the system so as to be set as computers hierarchical information 120. The information layers 100 and 110 are sent, divided, and set in response to execution of a synchronization command. The communication data (4) has a communication data format used to transfer a lower-order computers hierarchical information acquisition request to each computer of the system. The communication data (5) has a communication data format used to send lower-order computers hierarchical information to the upper-order computer.

Figure 5:
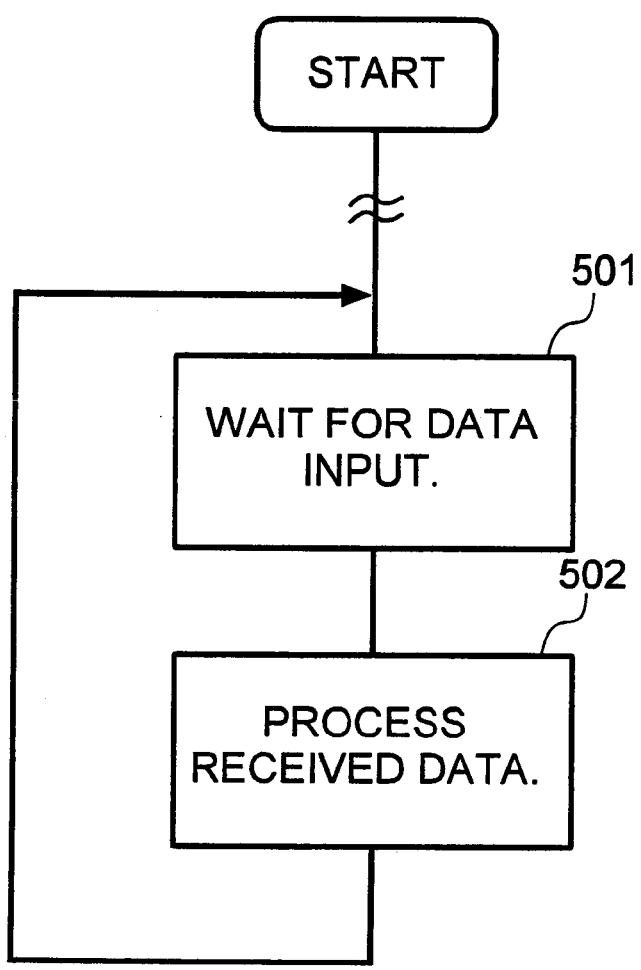
FIG. 5 is a flowchart of a processing procedure for the main routine in the embodiment of the present invention.

FIG. 5 shows a flowchart for a processing procedure executed by the main routine in this embodiment. As shown in FIG. 5, the main routine in this embodiment waits for a data input in step 501 after initializing a subject communication process. Receiving data, the main routine processes the data in step 502 as shown in the flowcharts in FIGS. 6 through 9 in accordance with each communication data type shown in FIG. 4. After the processing ends, the main routine waits for the next data input in step 501.

In this embodiment, in case the system configuration is modified in such a specific range as a branch office comprising a distributed computer, the supervisor enters the computers hierarchical information input data 310 denoting the configuration in the specific range and executes a distribution command, thereby directing each corresponding distributed computer to distribute the hierarchical information to other computers. Directed to distribute the hierarchical information, each distributed computer generates communication data (1) in which computers hierarchical information input data 310 is assumed as computers hierarchical information 412 and passes the communication data (1) to the main routine.

Figure 6:
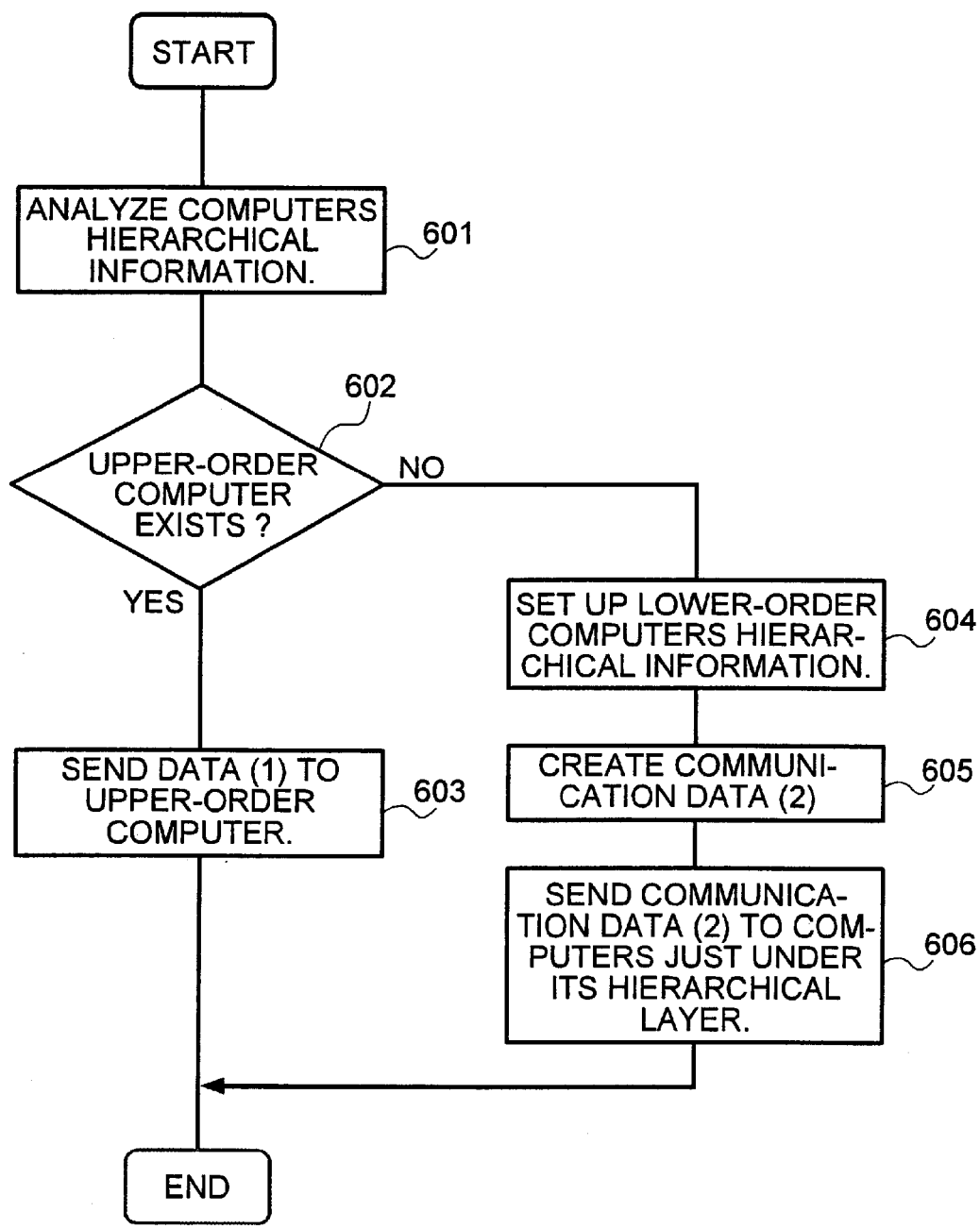
FIG. 6 is a flowchart for a processing procedure executed in response to received communication data (1) in the embodiment of the present invention.

FIG. 6 shows a flowchart for a processing procedure executed in response to received communication data (1) in this embodiment. In step 601, the computer configuration information distribution processor 210 acquires the computers hierarchical information 412 from the data part 402 of the received communication data (1) and extracts the upper-order computer information 311 denoting the upper-order computer of the subject computer, lower-order computers hierarchical information 312 denoting the lower-order computers of the subject computer, and the computers information 313 denoting the computers just under the subject computer from the computers hierarchical information 412 respectively.

In step 602, in case the configuration information distribution processor 210 finds the upper-order computer information 311 in the computers hierarchical information 412, control goes to step 603 so as to send the communication data (1) to the upper-order computer.

Then, in case the configuration information distribution processor 210 does not find the upper-order computer information 311 in step 602, control goes to step 604. In step 604, the processor 210 sets up the lower computers hierarchical information 312 extracted in step 601 in the lower computers hierarchical information 208.

In step 605, the processor 210 creates the communication data (2) from the hierarchical information set-up ID 421 and the computers hierarchical information 412 of the communication data (1). In step 606, the processor 210 sends the communication data (2) to the computers positioned just under the subject computer with use of the computers information 313 extracted in step 601. The information 313 denotes the information of the computers just under the subject computer.

Figure 7:
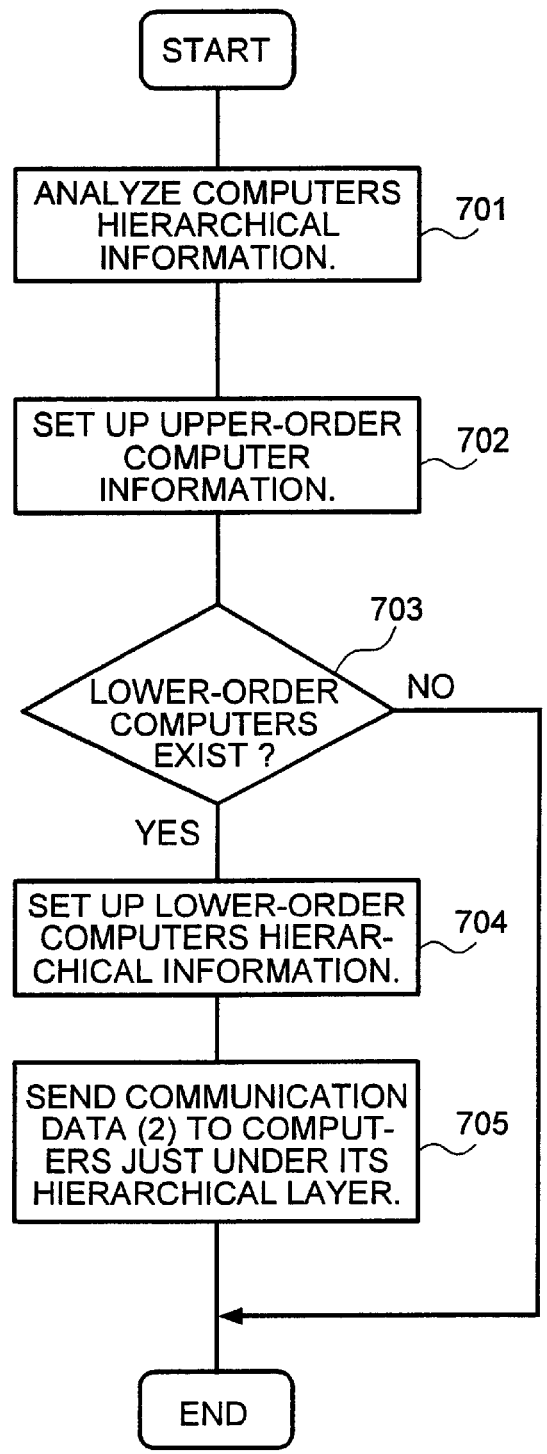
FIG. 7 is a flowchart for a processing procedure executed in response to received communication data (2) in the embodiment of the present invention.

FIG. 7 shows a flowchart for a processing procedure executed in response to received communication data (2) in this embodiment. In step 701, the computer configuration information set-up processor 211 acquires the computers hierarchical information 422 from the data part 402 of the received communication data (2) and extracts the upper-order computer information 311, the lower-order computers hierarchical information 312, and the computers information 313 of the subject computer from the computers hierarchical information 422 respectively.

In step 702, the processor 211 sets up the extracted upper-order computer information 311 in the upper-order computer information 207. Then, in step 703, in case the processor 211 finds any computer under the subject computer, control goes to step 704. In step 704, the processor 211 sets up the extracted lower-order computers hierarchical information 312 in the lower-order computers hierarchical information 208. In step 705, the processor 211 sends the communication data (2) to the computers positioned just under the subject computer with use of the extracted computers information 313.

Next, a description will be made for setting up of configuration information in response to modification of the computers hierarchical information 110 shown in FIG. 1, for example, modification of the information 110 to the computers hierarchical information input data 310 shown in FIG. 3. FIGS. 6 and 7 will be referenced for the description.

As shown in FIG. 3, in case such a computer as the computer 300, etc. is newly defined under the computer 121, the supervisor in the branch office, who manages the configuration in the specific range that includes the newly defined computer, creates and enters the computers hierarchical information input data 310 denoting the configuration in the range to the computer 122 etc. then executes a distribution command, thereby directing the computer 122 to distribute the hierarchical information to other computers. The computer that enters the input data 310 and executes the distribution command may be any computer in the range. In this case, the computer 122 shown in FIG. 1 is assumed to execute the distribution command.

Receiving the direction for distributing the hierarchical information, the computer 122 stores the hierarchical information set-up ID 421 in the communication data ID part 401 and the computers hierarchical information input data 310 in the data part 402 respectively, thereby generating the communication data (1) and passing the data (1) to the main routine.

In step 601 shown in FIG. 6, the configuration information distribution processor 210 of the computer 122 acquires the computers hierarchical information 412 from the data part 402 of the received communication data (1) and extracts the upper computer information 311 denoting the computer positioned above the computer 122, the lower computers hierarchical information 312 denoting the computers under the computer 122, and the computers information 313 denoting the computers positioned just under the computer 122 from the computers hierarchical information 412 respectively.

In step 602, the configuration information distribution processor 210 of the computer 122 finds that the computer 12 is positioned above the computer 122 and the upper-order computer information 311 is included in the computers hierarchical information 412. Control thus goes to step 603. The processor 210 then sends the communication data (1) to the computer 12 denoted by the upper-order computer information 311 in step 603.

In step 601, the processor 210 of the computer 12 acquires the computers hierarchical information 412 from the data part 402 of the received communication data (1) and extracts the upper-order computer information 311 denoting the computer positioned above the computer 12, the lower-order computers hierarchical information 312 denoting the computers positioned under the computer 12, and the lower-order computers information 313 denoting the computers positioned just under the computer 12 from the computers hierarchical information 412 respectively.

In step 602, in case the processor 210 of the computer 12 does not find that there is no computer positioned above the computer 12 and the upper-order computer information 311 is not included in the computers hierarchical information 412, control goes to step 604.

In step 604, the processor 210 sets up the lower-order computers hierarchical information 312 extracted in step 601 in the lower-order computers hierarchical information 208 of the computer 12.

Next, in step 605, the processor 210 of the computer 12 creates the communication data (2) from the hierarchical information set-up ID 421 and the computers hierarchical information 412 of the communication data (1). Then, in step 606, the processor 210 sends the communication data (2) to the computers 121 and 122 positioned just under the computer 12 with use of the lower-order computers information 313 extracted in step 601.

In step 701 shown in FIG. 7, the configuration information set-up processor 211 of the computer 121 acquires the computers hierarchical information 422 from the data part 402 of the received communication data (2) and extracts the upper computer information 311 denoting the computer positioned above the computer 121, the lower computers hierarchical information 312 denoting the computers under the computer 121, and the computers information 313 denoting the computers positioned just under the computer 121 from the computers hierarchical information 422 respectively.

In step 702, the configuration information set-up processor 211 of the computer 121 sets up the extracted upper-order computer information 311 in the upper-order computer information 207. In step 703, in case the processor 211 finds lower-order computers including the computer 300, etc. under the computer 121, control goes to step 704. In step 704, the processor 211 sets up the extracted lower-order computers hierarchical information 312 in the lower-order computers hierarchical information 208 of the computer 121. Then, in step 705, the processor 211 sends the communication data (2) to the computers 300, etc. positioned just under the computer 121 with use of the extracted computers information 313 just under the computer 121.

Hereinafter, in the same way, the hierarchical information denoted by the computers hierarchical information input data 310 is set up in all the computers positioned under the computer 12.

In this embodiment, after configuration information in such a specific range as a branch office comprising a distributed computer is set up in the computers in the range, then the supervisor executes a synchronize command so as to direct each computer to execute a synchronization process so as to reflect the hierarchical information set in each computer throughout the whole system. Receiving the direction for synchronizing hierarchical information among corresponding computers, each computer generates the communication data (3) and passes the data (3) to the main routine.

Figure 8:
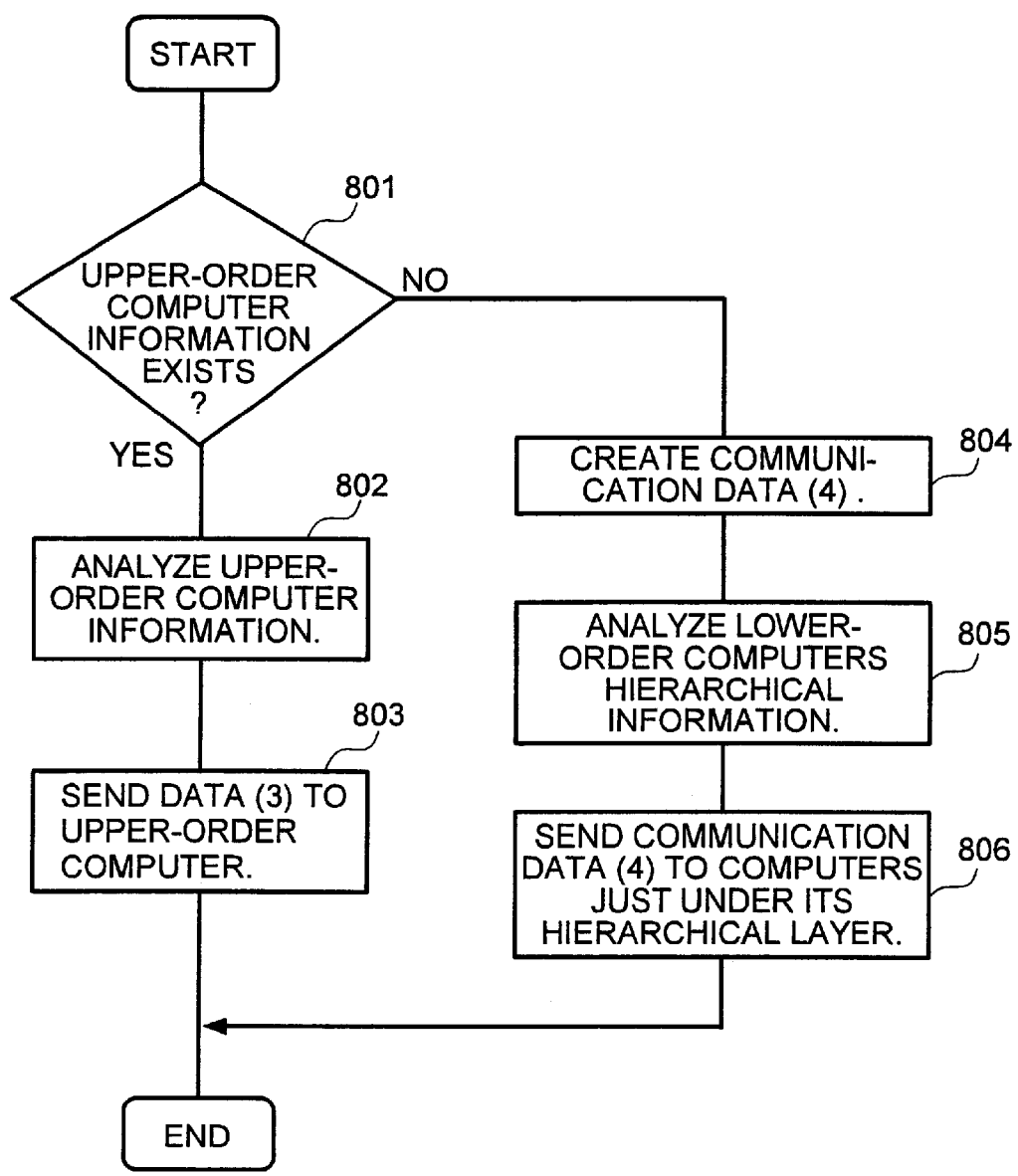
FIG. 8 is a flowchart for a processing procedure executed in response to received communication data (3) in the embodiment of the present invention.

FIG. 8 shows a flowchart for a processing procedure executed in response to received communication data (3) in this embodiment. The synchronization request processor 212, when receiving the communication data (3), checks whether or not the subject computer has the upper-order computer information 207 in step 801. If YES is selected in step 801, control goes to step 802. In step 802, the processor 212 analyzes the upper-order computer information 207 and sends the communication data (3) to the upper-order computer in step 803.

In case the processor 212 cannot find the upper-order computer information 207 in step 801, control goes to step 804. The processor 212 then creates communication data (4) in step 804. The processor 212 analyzes the lower-order computers hierarchical information 208 in step 805 and extracts the computers information 313 denoting the computers positioned just under the subject computer. In step 806, the processor 212 sends the communication data (4) to the computers positioned just under the subject computer with use of the extracted information 313.

Figure 9:
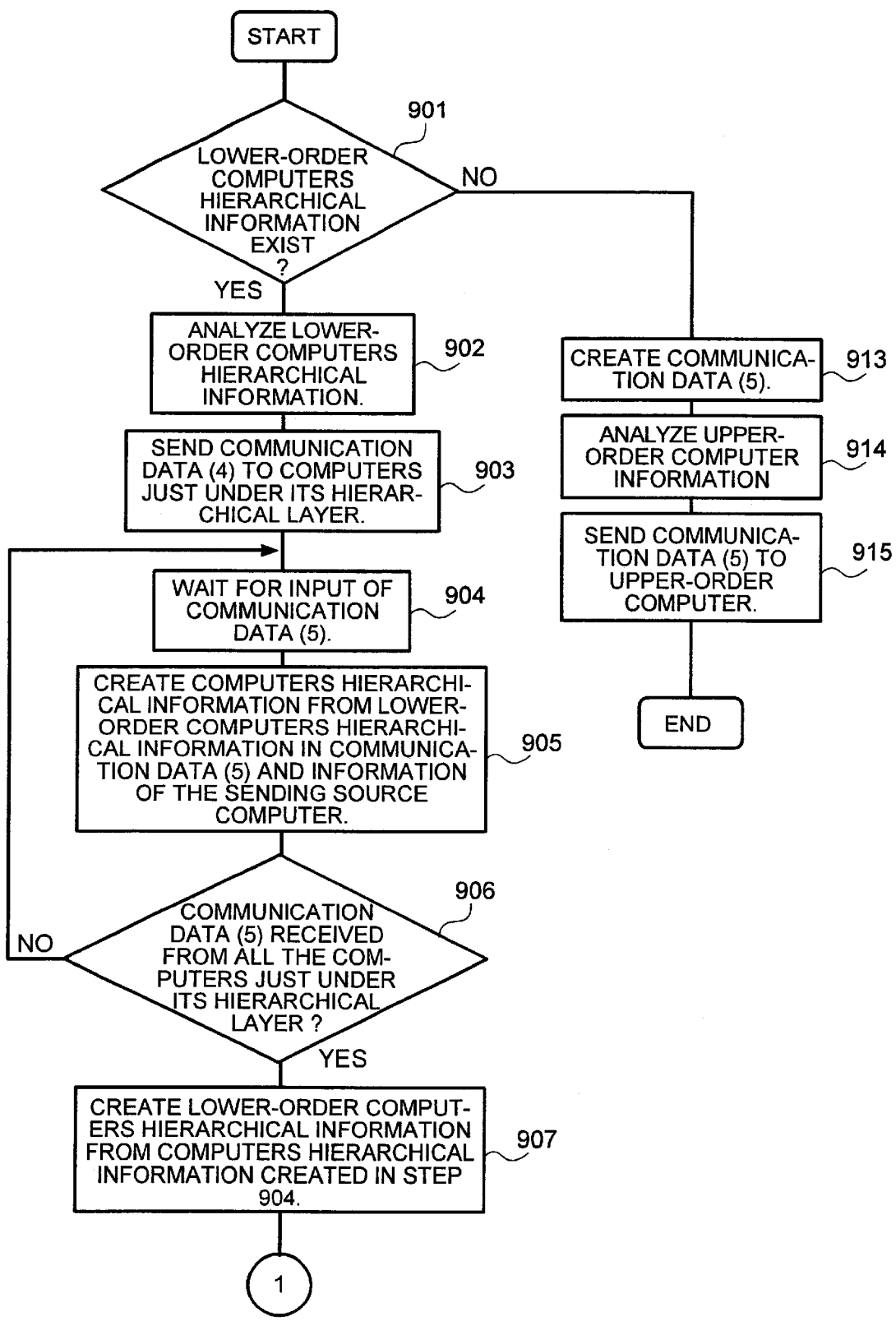
FIG. 9 is a flowchart for a processing procedure executed in response to received communication data (4) in the embodiment of the present invention.
Figure 10:
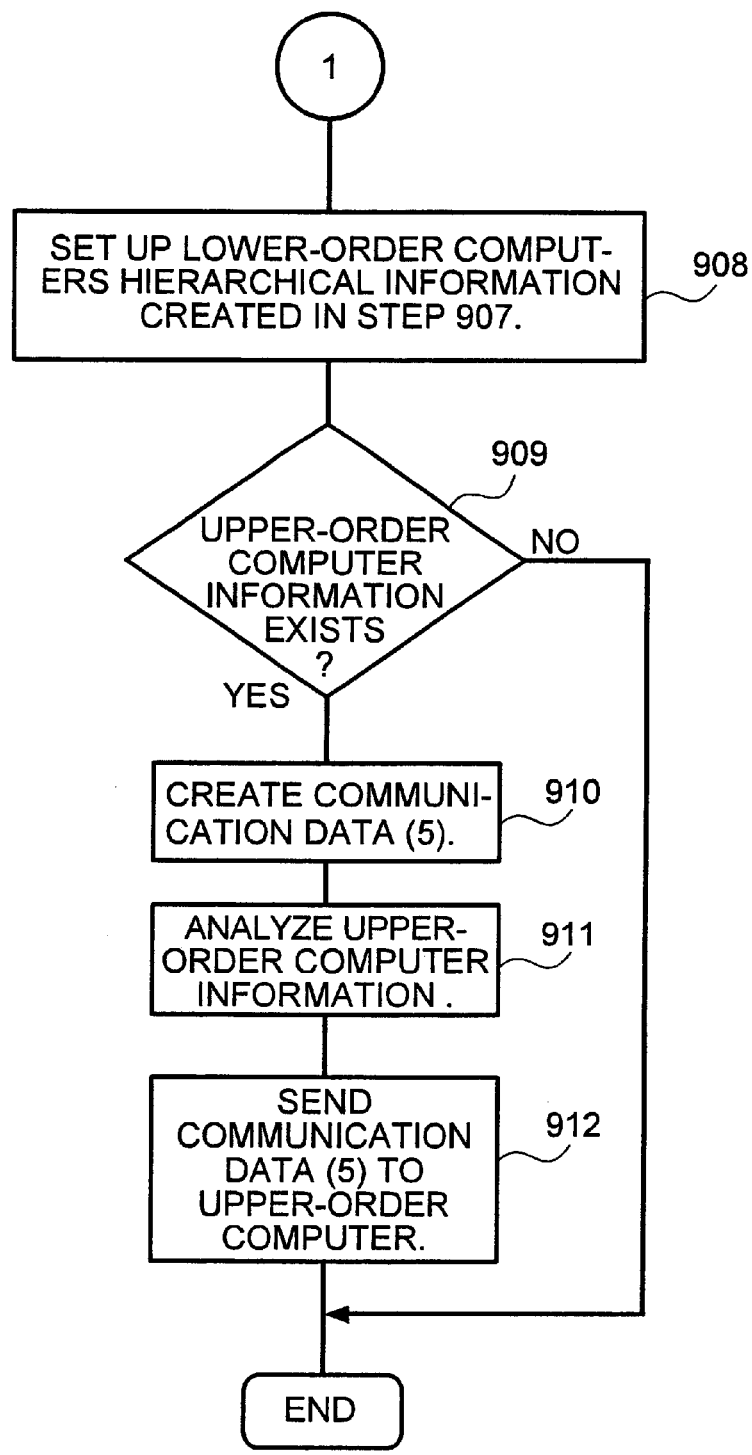
FIG. 10 is a flowchart for a processing procedure continued from that shown in FIG. 9 in the embodiment of the present invention.

FIG. 9 shows a flowchart for a processing procedure executed in response to received communication data (4) in this embodiment. FIG. 10 shows a flowchart for a processing procedure continued from that shown in FIG. 9 in this embodiment. In step 901, the configuration information acquisition processor 213 of a subject computer, when receiving the communication data (4), checks whether or not the subject computer has the lower-order computers hierarchical information 208. If YES is selected in step 901, control goes to step 902.

In step 902, the processor 212 extracts the computers information 313 denoting the computers positioned just under the subject computer from the lower-order computers hierarchical information 208. In step 903, the processor 212 sends the communication data (4) to the computers positioned just under the subject computer with use of the extracted computers information 313.

In step 904, the processor 212 waits for the communication data (5) to be received from the computers positioned just under the subject computer. When the processor 212 receives the communication data (5), control goes to step 905. The processor 212 then creates the computers hierarchical information 315 of the computers positioned just under the subject computer from the lower-order computers hierarchical information 452 of the received communication data (5) and the computer information denoting the sending source computer of the communication data (5).

In step 906, in case the processor 212 receives the communication data (5) from all the computers positioned just under the subject computer, control goes to step 907. Otherwise, control goes to step 904.

In step 907, the processor 212 creates the lower-order computers hierarchical information denoting the computers positioned under the subject computer from the computers hierarchical information 316 created in step 905. In step 908, the processor 212 sets up the lower-order computers hierarchical information 312 of the subject computer created in step 907 in the lower-computer hierarchical information 208.

In step 909, the configuration information sending processor 214 checks if there is the upper-order computer information 207 in the subject computer. If YES is selected in step 909, control goes to step 910.

In step 910, the processor 214 creates the communication data (5) again from the lower-order computers hierarchical information 312 created in step 907 and the lower-order computers hierarchical information ID 451, then analyzes the upper-order computer information 207 in step 911 and sends the communication data (5) to the upper-order computer in step 912.

On the other hand, the processor 214 checks in step 901 if there is the lower-order computers hierarchical information 208. If NO is selected in step 901, control goes to step 913.

In step 913, the processor 214 creates the communication data (5) from a lower-order computer hierarchical information ID 451 and an empty data part 402. Then, the processor 214 analyzes the upper-order computer information 207 in step 914 and sends the communication data (5) to the upper-order computer in step 915.

Next, a description will be made of a synchronization process with reference to FIGS. 8 and 9. The synchronization process is executed to reflect the computers hierarchical information 110 modified by the computers hierarchical information input data 310 shown in FIG. 3 throughout the whole computers hierarchical information 120.

After setting up the computers hierarchical information input data 310 shown in FIG. 3 in other computers under the computer 12, any supervisor including the supervisor of the subject branch office can execute a synchronize command so as to direct each computer to execute a synchronization process that will cause the hierarchical information set up in each computer to be reflected throughout the whole system. The synchronize command may be executed on any computer in the system. In this embodiment, however, it is assumed that the synchronize command is executed in the computer 122 as shown in FIG. 1.

Directed to perform for the synchronization processing, the computer 122 stores the synchronization request ID 431 in the communication data ID part 401 so as to generate the communication data (3) and passes the data (3) to the main routine.

In step 801 shown in FIG. 8, the synchronization request processor 212 of the computer 122, when receiving the communication data (3), checks if there is the upper-computer information 207 in the computer 122. Because the computer 122 has the information 207 at this time, control goes to step 802. The processor 212 then analyzes the information 207 in step 802 and sends the communication data (3) to the computer 12 specified by the information 207 in step 803.

In step 801, the synchronization request processor 212 of the computer 12, when receiving the communication data (3) from the computer 122, sends the communication data (3) to the computer 1 specified by the upper-order computer information 207 of the computer 12 just like the computer 122.

In step 801, the synchronization request processor 212 of the computer 1, when receiving the communication data (3) from the computer 12, checks if the computer 1 has the upper-order computer information 207 at this time. Because the computer 1 does not have the information 207, control goes to step 804.

In step 804, the processor 212 stores the lower-order hierarchical information acquisition request ID 441 in the communication data ID part 401 so as to create the communication data (4). In step 805, the processor 212 analyzes the lower-order computers hierarchical information 208 of the computer 1 so as to extract the computers information 313 denoting the computers positioned just under the computer 1. Then, in step 806, the processor 212 sends the communication data (4) to the computers 11 and 12 positioned just under the computer 1 with use of the extracted computers information 313.

In step 901 shown in FIG. 9, the configuration information acquisition processor 213 of the computer 11, when receiving the communication data (4), checks if the computer 11 has the lower-order hierarchical information 208. Because the computer 11 has the lower-order computers hierarchical information 208 at this time, control goes to step 902.

In step 902, the processor 213 extracts the computers information 313 denoting the computers positioned just under the computer 11 from the lower-order computers hierarchical information 208 of the computer 11. Then, in step 903, the processor 213 sends the communication data (4) to the computers 111 and 112 positioned just under the computer 11 with use of the extracted computers information 313.

In step 901, the processor 213 sends the communication data (4) to the computers 111 and 112 positioned just under the computer 111 just like the computer 11.

In step 901, the configuration information acquisition processor 213 of the computer 1111, when receiving the communication data (4), checks if the computer 1111 has the lower-order computers hierarchical information 208. Because the computer 1111 has the information 208 at this time, control goes to step 913.

In step 913, the configuration information sending processor 214 of the computer 1111 creates communication data (5) from a lower-order hierarchical information ID 451 and an empty data part 402. The processor 214 then analyzes the upper-order computer information 207 of the computer 1111 in step 914 and sends the communication data (5) to the computer 111 specified by the information 207 in step 915.

In step 904, the configuration information acquisition processor 213 of the computer 111 waits for the communication data (5) to be received from the computers 1111 and 1112 positioned just under the computer 111. When the processor 213 receives the communication data (5), control goes to step 905. The processor 213 then creates the computers hierarchical information 315 of the computers 1111 and 1112 positioned just under the computer 111 from the lower-order computers hierarchical information 452 of the received communication data (5) and the computer information denoting the computer from which the communication data (5) has been sent.

In step 906, in case the processor 213 receives the communication data (5) from all the computers positioned just under the computer 111, control goes to step 907. Otherwise, control goes to step 904.

In step 907, the configuration information acquisition processor 213 of the computer 111 creates the lower-order computers hierarchical information 312 denoting the computers positioned under the computer 111 from the computers hierarchical information 315 created in step 905. The processor 213 then sets up the lower-order computers hierarchical information 312 of the computer 111 created in step 907 in the lower-order computers hierarchical information 208 of the computer 111 in step 908.

In step 909, the configuration information sending processor 214 of the computer 111 checks if the computer 111 has the upper-order computer information 207. Because the computer 111 has the information 207 at this time, control goes to step 910.

In step 910, the processor 214 creates the communication data (5) again from the lower-order computers hierarchical information 312 created in step 907 and the lower-order hierarchical information ID 451. The processor 214 then analyzes the information 207 in step 911 and sends the communication data (5) to the computer 11 specified by the upper-order computers information 207 in step 912.

Just like the computer 111, the configuration information acquisition processor 213 of the computer 11 sets up the created information 312 in the lower-order computers hierarchical information 208 of the computer 11. The configuration information sending processor 214 of the computer 11 sends the recreated communication data (5) to the computer 1 specified by the upper-order computer information 207 of the computer 11.

Hereinafter, data is set/sent in/to the lower-order computers hierarchical information 208 from lower-order computers to the highest-order computer sequentially so that the information 208 is updated in all the lower-order computers of the computer 1.

In step 904, the configuration information acquisition processor 213 of the computer 1 waits for the communication data (5) to be received from the computers 11 and 12 positioned just under the computer 1. When the processor 213 receives the communication data (5), control goes to step 905. The processor 213 then creates the computers hierarchical information 315 of the computers 11 and 12 positioned just under the computer 1 from the lower-order computers hierarchical information 452 of the received communication data (5) and the information of the source computer that has sent the communication data (5).

In step 906, in case the processor 213 receives the communication data (5) from all the computers positioned just under the computer 1, control goes to step 907. Otherwise, control goes to step 904.

In step 907, the processor 213 creates the lower-order computers hierarchical information 312 denoting the computers positioned under the computer 1 from the computers hierarchical information 315 created in step 905. The processor 213 then sets up the information 312 created in step 907 in the lower-order computers hierarchical information layer 208 of the computer 1 in step 908.

In step 909, the configuration information sending processor 214 of the computer 1 checks if the computer 1 has the upper-order computer information 207. Because the computer 1 does not have the information 207 at this time, the processor exits the processing.

As described above, in this embodiment, after the computers configuration information in such a specific range as a computer network, etc. in a branch office is set up, a synchronized command is executed in the manager so as to send the lower-order computers configuration information to the upper-order computer. Consequently, the computers configuration information set up in the specific range can be reflected throughout the configuration information of the whole system. It is thus possible to modify the configuration information of the whole system with the configuration information of each of lower-order computers separated in a specific range; the supervisor is not required to know the whole configuration information of a distributed computer system when modifying the configuration information of any of the distributed computers in a specific range respectively.

Furthermore, in this embodiment, setting up of the configuration information in a specific range is started at the highest-order computer in the range, so that the processing becomes the same as that of the processing system of distributed computers in which a process is executed in response to a remote command issued from an upper-order computer to lower-order computers. It is thus possible to set up the configuration information in accordance with an existing processing system.

Furthermore, in this embodiment, the configuration information of a distributed computer is represented by both of the upper-order computer information 207 denoting the upper-order computer connected to the subject computer and the lower-order computers hierarchical information 208 denoting the hierarchical information of the lower-order computers connected to the subject computer. Updating of the configuration information of the subject computer is started at the lowest-order computer to the highest-order computer in a system so as to synchronize the lower-order computers hierarchical information 208 among all the computers in the system by receiving the configuration information set up in other computers. It is thus possible to assume the synchronization of the information 208 without any of duplication of the synchronization processing and disagreement in hierarchical information among those computers.

As described above, according to the configuration information management system in this embodiment, the configuration information in a specific range is set up, then the set-up information is reflected throughout the configuration information of the whole system. It is thus possible to divide the logical configuration information of the system and give the divided configuration information to computers in a specific range respectively so as to make it easier to manage the logical information of each distributed computer.

Figure 11:
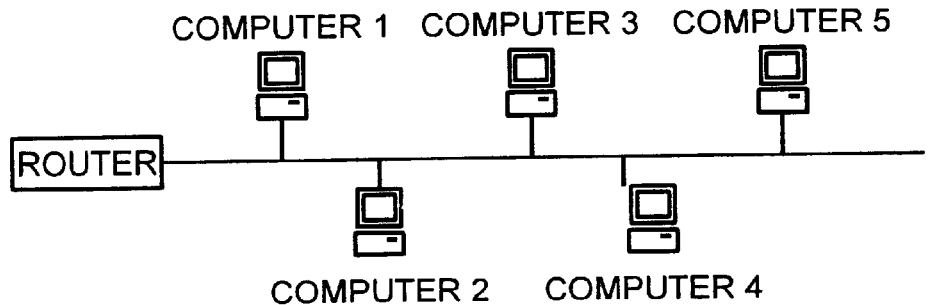
FIG. 11 shows an example of a physical configuration of the configuration information management system.

The logical configuration information of a computer denotes configuration information (as shown in the lower part of FIG. 12) corresponded by the supervisor to a subject computer according to its use purpose. The logical configuration information differs from the information denoting the physical connection state of the computer (FIG. 11). In this specification, logical configuration information is managed as an embodiment of the present invention. However, other information may also be managed by the configuration information management method as described above in the present invention.

According to the present invention, therefore, because the configuration information in a specific range is reflected throughout the configuration of the subject whole system after it is set up in the range, the logical configuration information can be divided into those in specific ranges and the configuration information in a specific range can be given to computers in the specific range. Thus, this method makes it easier to manage the logical configuration information of each of those distributed computers.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

The preceding has been a description of the preferred embodiment of the invention. It will be appreciated that deviations and modifications can be made without departing from the scope of the invention, which is defined by the appended claims.

What is claimed is:

1. A method for managing logical hierarchical information of computers in a distributed computer system, said method in a subject computer comprising:

receiving first hierarchical information from at least one lower-order computer relative to said subject computer, said first hierarchical information representative of a hierarchical relation among some of said computers in said distributed computer system;

updating second hierarchical information that is stored in said subject computer according to said first hierarchical information, thereby producing updated hierarchical information; and communicating said updated hierarchical information to an upper-order computer relative to said subject computer.

2. A method for managing logical hierarchical information of computers in a distributed computer system, said method in a subject computer comprising:

receiving first hierarchical information and second hierarchical information, each representative of a logical hierarchical relation among some of said computers in said distributed computer system, said first hierarchical information being communicated from a first lower-order computer relative to said subject computer, said second hierarchical information being communicated from a second lower-order computer relative to said subject computer;

combining said first hierarchical information and said second hierarchical information to generate new hierarchical information; and communication said new hierarchical information to an upper-order computer relative to said subject computer.

3. A method for managing logical hierarchical information of computers in a distributed computer system, said method in a subject computer comprising:

receiving first hierarchical information from a first lower-order computer relative to said subject computer, showing a first logical hierarchical relation among some of said computers in said distributed computer system;

receiving second hierarchical information from a second lower-order computer relative to said subject computer, showing a second logical hierarchical relation among some of said computers in said distributed computer system;

combining said first hierarchical information and said second hierarchical information to generate new hierarchical information; and updating hierarchical information associate with said subject computer according to said new hierarchical information.

4. The method according to claim 3 further comprising communicating said new hierarchical information to an upper-order computer relative to said subject computer.

5. A method for managing logical hierarchical information of computers in a distributed computer system, said method in a subject computer comprising:

receiving first hierarchical information showing a logical hierarchical relation of computers in said distributed computer system, said first hierarchical information being communicated from a lower-order computer relative to said subject computer;

communicating second hierarchical information held in said subject computer to an upper-order computer; and subsequent to said communicating, updating said second hierarchical information according to said first hierarchical information.

6. An apparatus in a subject computer for managing logical hierarchical information of computers in a distributed computer system, comprising:

means for receiving hierarchical information showing a logical hierarchical relation among some of said computers in said distributed computer system from at least one lower-order computer relative to a subject computer;

means for updating hierarchical information held in said subject computer according to said hierarchical information received from said lower-order computer; and means for sending said updated hierarchical information to an upper-order computer relative to said subject computer.

7. A computer program product stored on a computer readable storage medium for operating a subject computer to perform method steps relating to managing logical hierarchical information of computers in a distributed computer system, the method steps comprising:

receiving first hierarchical information from a lower-order computer, said first hierarchical information indicative of a logical hierarchical relation among some of said computers in said distributed computer system;

producing updated hierarchical information in said subject computer according to said first hierarchical information and hierarchical information associated with said subject computer; and communication said updated hierarchical information to an upper-order computer relative to said subject computer.

\* \* \* \* \*